United States Patent
Sekita

[11] Patent Number: 5,917,662
[45] Date of Patent: Jun. 29, 1999

[54] PHOTOTAKING OPTICAL SYSTEM AND OPTICAL DEVICE

[75] Inventor: Makoto Sekita, Tokyo, Japan

[73] Assignee: Canon Kabushiki Kaisha, Tokyo, Japan

[21] Appl. No.: 08/789,802

[22] Filed: Jan. 28, 1997

[30] Foreign Application Priority Data

Jan. 29, 1996 [JP] Japan .................................. 8-034319

[51] Int. Cl.$^6$ .......................... G02B 27/14; G02B 17/00
[52] U.S. Cl. .......................................... 359/729; 359/633
[58] Field of Search .................................. 359/726, 727, 359/728, 729, 730, 731, 630, 631

[56] References Cited

U.S. PATENT DOCUMENTS

| | | | |
|---|---|---|---|
| 3,674,334 | 7/1972 | Offner | 350/55 |
| 4,775,217 | 10/1988 | Ellis | 350/538 |
| 5,063,586 | 11/1991 | Jewell et al. | 378/34 |
| 5,093,567 | 3/1992 | Staveley | 250/221 |
| 5,452,126 | 9/1995 | Johnson | 359/407 |
| 5,453,877 | 9/1995 | Gerbe et al. | 359/633 |
| 5,594,588 | 1/1997 | Togino | 359/631 |
| 5,663,833 | 9/1997 | Nanba et al. | 359/631 |
| 5,687,025 | 11/1997 | Nanba | 359/630 |
| 5,699,194 | 12/1997 | Takahashi | 359/630 |
| 5,701,202 | 12/1997 | Takahashi | 359/631 |
| 5,726,807 | 3/1998 | Nakaoka et al. | 359/631 |

FOREIGN PATENT DOCUMENTS

| | | |
|---|---|---|
| 0730169 | 9/1996 | European Pat. Off. . |
| 2-297516 | 12/1990 | Japan . |
| 7-104209 | 4/1995 | Japan . |
| 7-333551 | 12/1995 | Japan . |
| 8-050256 | 2/1996 | Japan . |
| 8-179223 | 7/1996 | Japan . |
| 8-179238 | 7/1996 | Japan . |
| 8-234136 | 9/1996 | Japan . |
| 8-234137 | 9/1996 | Japan . |

*Primary Examiner*—Scott J. Sugarman
*Attorney, Agent, or Firm*—Fitzpatrick, Cella, Harper & Scinto

[57] ABSTRACT

This invention is directed to a phototaking optical system including a solid optical element having a refraction incident surface on incident surface on which light from an object is incident, a plurality of curved reflection surfaces which sequentially reflect the light from the refraction incident surface, and a refraction exit surface from which the light from the curved reflection surfaces emerges, wherein at least one of the refraction incident surface and the refraction exit surface is a rotation asymmetrical surface.

10 Claims, 5 Drawing Sheets

PHOTOTAKING OPTICAL SYSTEM AND OPTICAL DEVICE

BACKGROUND OF THE INVENTION

1. Field of the Invention

The present invention relates to a phototaking optical system and an optical element and, more particularly, to a phototaking optical system and an optical element which are suitably used for an optical device such as a camera.

2. Related Background Art

As a conventional device having a reflection surface as part of an optical system, for example, a telescope like the one shown in FIG. 1 is available. The telescope shown in FIG. 1 is of a type called a Cassegrain reflecting telescope. This telescope is constituted by a concave mirror 51, a convex mirror 52, and an eyepiece 55. Parallel light 54 from an object at an infinite distance is reflected as a convergent light beam by the concave mirror 51 toward the object side. The convergent light beam is reflected by the convex mirror 52, placed on the object side of the concave mirror 51, toward the observer side to form an object image on an intermediate imaging plane 53. Thereafter, the object image is observed by using the eyepiece 55 placed behind the intermediate imaging plane 53.

As described above, in the Cassegrain reflecting telescope, the optical path of the telephoto lens system constituted by the refracting lenses and having a long total lens length is folded by using the two reflecting mirrors so as to decrease the overall length of the optical system. However, in the Cassegrain reflecting telescope, since a real image is formed, and the eyepiece is placed behind the image, a reduction in size in the longitudinal direction is limited.

In contrast to this, a reflecting optical system designed to attain a reduction in size by integrating reflection and refraction surfaces is also known.

FIG. 2 is a schematic view showing the main part of an observation optical system disclosed in U.S. Pat. No. 4,775,217. This observation optical system is an optical system which is used to observe an outdoor scene, together with a display image displayed on an information display unit, in an overlapping state.

In this observation optical system, a display light beam 65 emerging from a display image on an information display unit 61 is reflected by a surface 62 toward the object side and incident on a concave half mirror surface 63. After being reflected by the half mirror surface 63, the display light beam 65 is converted into an almost parallel light beam owing to the refracting power of the concave surface 63. The parallel light beam is refracted/transmitted through the surface 62 to form an enlarged virtual image of the display image at an infinite distance on the object side. At the same time, the display light beam 65 is incident on a pupil 64 of the observer to allow him/her to recognize the display image.

Meanwhile, an object light beam 66 from an object is incident on a surface 67 almost parallel to the reflection surface 62. The light beam is refracted and reaches the concave half mirror surface 63. A semi-transparent film is deposited on the concave surface 63. The object light beam 66 is partly transmitted through the concave surface 63 and refracted/transmitted through the surface 62. The light beam is then incident on the pupil 64 of the observer. With this operation, the observer can visually recognize the display image in the outdoor scene in an overlapping state.

FIG. 3 is a schematic view showing the main part of an observation optical system disclosed in Japanese Laid-Open Patent Application No. 2-297516. This observation optical system is also an optical system which is used to observe an outdoor scene, together with a display image displayed on an information display unit, in an overlapping state.

In this observation optical system, a display light beam 74 emerging from an information display unit 70 is transmitted through a plane 77 as a part of an optical member Pa and enters the optical member Pa to be incident on a parabolic reflection surface 71. The display light beam 74 is reflected by the reflection surface 71 to become a convergent light beam, thereby forming an image on a focal plane 76.

At this time, the display light beam 74 reflected by the parabolic reflection surface 71 has reached the focal plane 76 after being totally reflected by the two parallel planes constituting the optical member Pa, i.e., the plane 77 and a plane 78. With this arrangement, a low-profile optical system is attained.

The display light beam 74 emerging as divergent light from the focal plane 76 is totally reflected by the planes 77 and 78 and incident on a half mirror 72 constituted by a parabolic surface. The light beam is reflected by the half mirror 72. At the same time, this light beam forms an enlarged virtual image of the display image owing to the refracting power of the half mirror 72 and becomes an almost parallel light beam. The light beam is transmitted through the plane 77 and incident on a pupil 73 of the observer, thereby allowing the observer to recognize the display image.

Meanwhile, an external object light beam 75 is transmitted through a surface 78b as a part of an optical member Pb and transmitted through the half mirror 72. The light beam is then transmitted through the plane 77 and incident on the pupil 73 of the observer. The observer then visually recognizes the display image in the outdoor scene in an overlapping state.

The observation optical system shown in FIG. 2 is constituted by the flat refraction surface and the concave half mirror surface to attain a reduction in size. However, the surface 62 from which light beams from the information display unit and the outdoor scene emerge is not designed to perform aberration correction because the surface 62 is used as a total reflection surface for a light beam from the information display unit 61.

The observation optical system shown in FIG. 3 is designed to attain a reduction in size by using the flat refraction surface, the parabolic reflection surface, and the half mirror constituted by the parabolic surface. However, the incident and exit surfaces for an object light beam from an outdoor scene are not designed to perform aberration correction because the extended surfaces of the incident and exit surfaces are used as total reflection surfaces for guiding a light beam from the information display unit 70.

SUMMARY OF THE INVENTION

It is an object of the present invention to provide a phototaking optical system, an optical element, an optical device, which maintain miniaturization, perform proper aberration correction, and attain excellent optical performance.

In order to achieve the above object, according to the present invention, there is provided a phototaking optical system characterized by comprising a solid optical element including a refraction incident surface on which light from an object is incident, a plurality of curved reflection surfaces which sequentially reflect the light from the refraction incident surface, and a refraction exit surface from which the light from the curved reflection surfaces emerges, wherein at least one of the refraction incident surface and the refraction exit surface is a rotation asymmetrical surface.

In addition to the above arrangement, the solid optical element of the present invention is characterized in that a reference axis connecting an object center and the pupil center of the optical element is parallel to the refraction incident surface and the refraction exit surface.

In the phototaking optical system and the optical element of the present invention, the rotation asymmetrical surface has a shape for correcting a rotation asymmetrical aberration caused in light passing through the optical element. For example, this shape has only one symmetrical shape.

In addition, at least one of the curved reflection surfaces of the optical element is preferably inclined with respect to an object surface.

Furthermore, at least one of the plurality of curved reflection surfaces is a rotation asymmetrical surface.

Moreover, the above object can be achieved by applying the phototaking optical system and the optical element of the present invention to an optical device such as a camera.

DETAILED DESCRIPTION OF THE PREFERRED EMBODIMENTS

Prior to a description of the embodiments, the manner of expressing the specifications of the embodiments and items common to the embodiments will be described.

Figure 1:
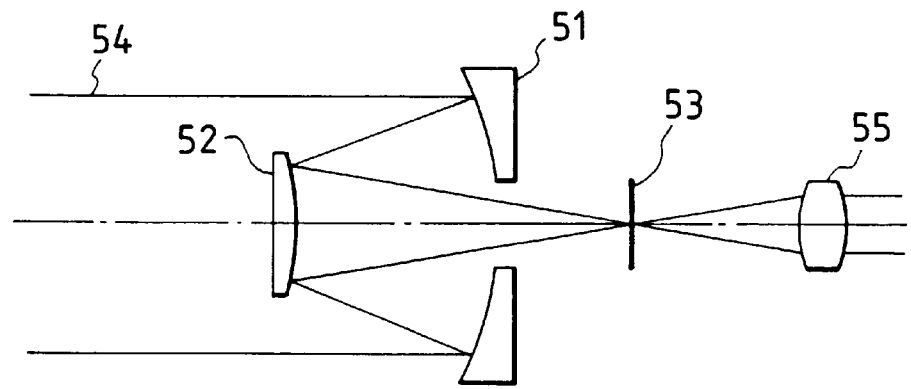
FIG. 1 is a view for explaining a conventional reflecting telescope.
Figure 2:
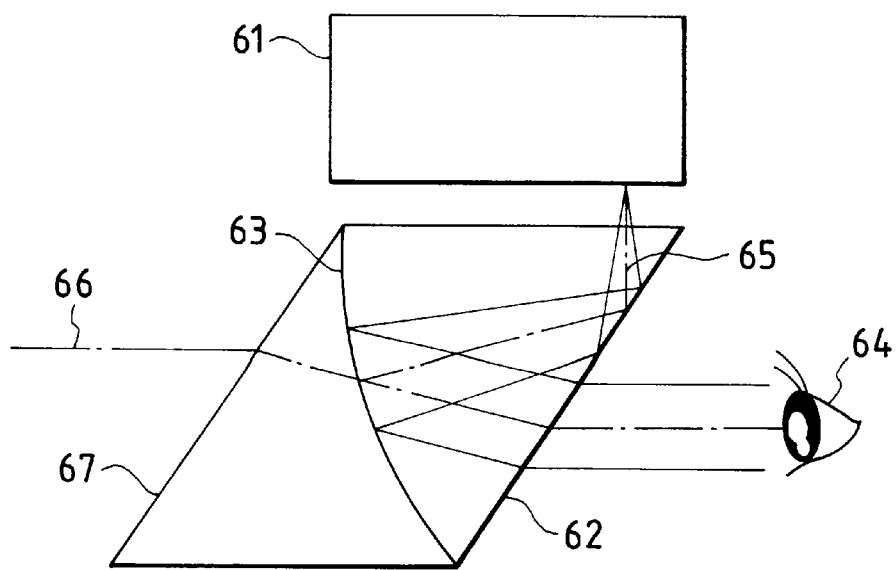
FIG. 2 is a view for explaining a conventional observation optical system.
Figure 3:
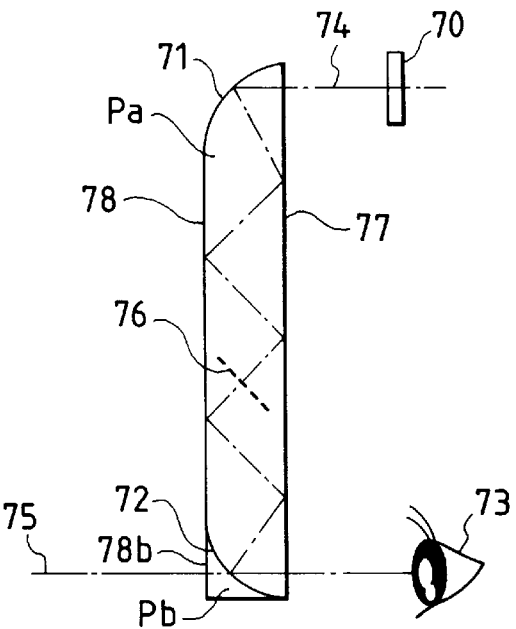
FIG. 3 is a view for explaining a conventional observation optical system.
Figure 4:
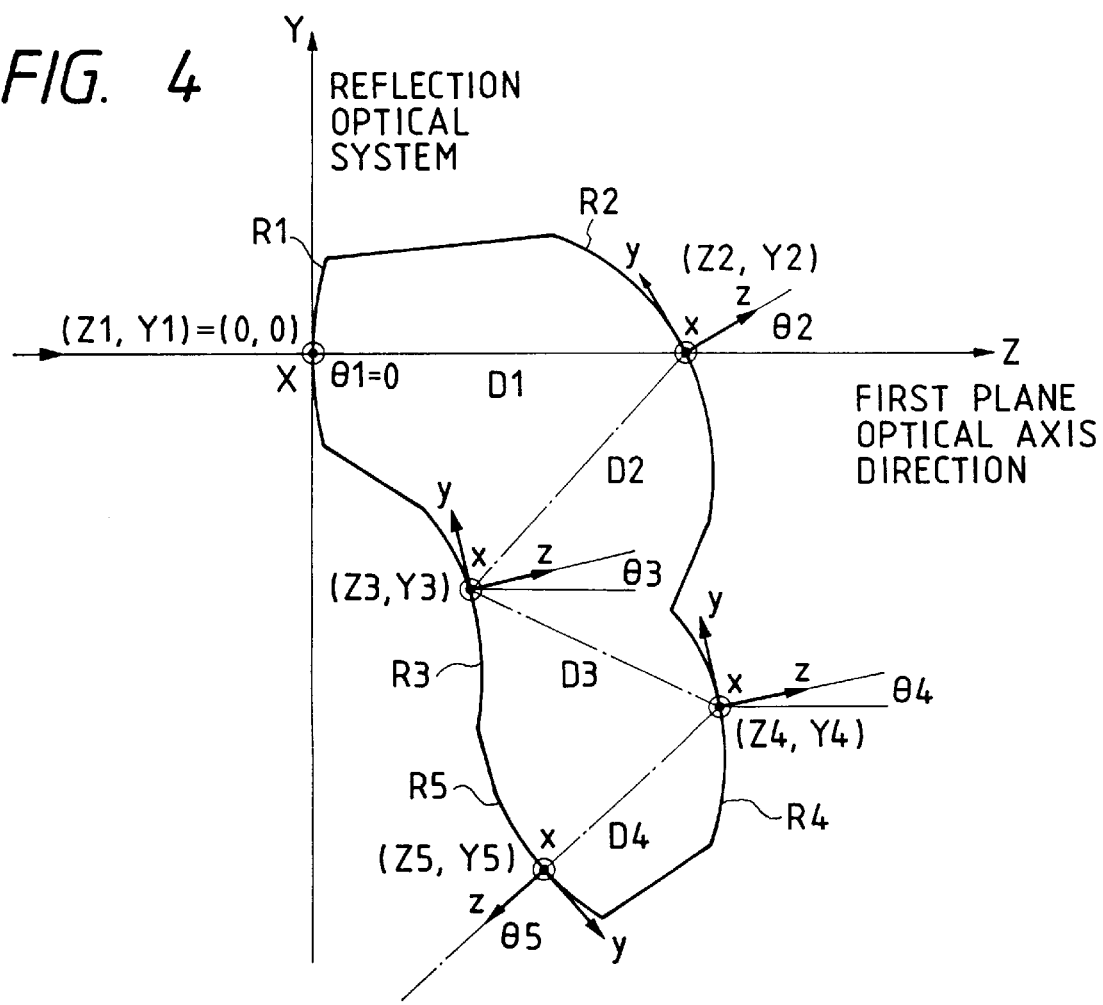
FIG. 4 is a graph for explaining a coordinate system according to the embodiments of the present invention.

FIG. 4 is a graph for explaining a coordinate system for defining the constituent data of an optical element of the present invention. In each embodiment, the surface at the ith position along a light beam (indicated by the alternate long and short dashed line in FIG. 4 and called a reference axis light beam) propagating from the object side to the imaging plane is defined as the ith surface.

Referring to FIG. 4, a first surface R1 is a refraction surface; a second surface R2, a reflection surface tilted with respect to the first surface R1; third and fourth surfaces R3 and R4, reflection surfaces shifted/tilted with respect to the respective preceding surfaces; and a fifth surface R5, a refraction surface shifted/tilted with respect to the fourth surface R4. A reflecting optical system is constituted by these refraction and reflection surfaces.

Since the optical system of the present invention is an eccentric optical system, the surfaces constituting the optical system have no common optical axis. In each embodiment of the present invention, therefore, an absolute coordinate system using the center of the effective aperture of the first surface as an origin is set.

In each embodiment, the center point of the effective aperture of the first surface is defined as the origin, and the path of a light beam (reference axis light beam) passing through the origin and the center of the imaging plane is defined as the reference axis of the optical system. In addition, the propagating direction of a reference axis light beam is defined as the positive direction of the reference axis in each embodiment.

In each embodiment, the reference axis as a reference for the optical system is set in the above manner. However, as a reference axis for the optical system, any axis may be used, which is suitable in terms of optical design or aberration or can be suitably used to express the shapes of the surfaces constituting the optical system. In general, however, the path of a light beam passing through the center of the imaging plane and a stop, an incident pupil, an exist pupil, or the center of the first or last surface of the optical system is set as a reference axis as a reference for the optical system.

In each embodiment, the path of a light beam (reference axis light beam) passing through the center of the effective aperture of the first surface and reaching the center of the final imaging plane after being refracted/reflected by the respective refraction and reflection surfaces is set as the reference axis. The ordinal numbers are assigned to the respective surfaces in the order in which a reference axis light beam reaches the imaging plane after being refracted/reflected.

The reference axis therefore changes its direction along the ordinal numbers set for the respective surfaces according to the refraction and reflection laws, and eventually reaches the center of the imaging plane.

The path of a reference axis light beam incident on each surface is referred to as the "incident reference axis" of each surface, and the path of a reference axis light beam refracted or reflected by each surface and emerging therefrom is referred to as the "exit reference axis" of each surface. Similarly, a reference axis light beam incident on each surface is referred to as an "incident reference axis light beam", and a reference axis light beam emerging from each surface is referred to as an "exit reference axis light beam".

All the tilt surfaces constituting the optical system in each embodiment of the present invention are basically tilted within the same plane. The respective axes of the absolute coordinate system are therefore defined as follows:

Z-axis: a reference axis passing through the origin and extending toward the second surface R2.

Y-axis: a straight line passing through the origin and defining 90° within the tilt plane (the drawing surface of FIG. 4) with respect to the Z-axis in the counterclockwise direction.

X-axis: a straight line which passes through the origin and is perpendicular to the Z- and Y-axes (a straight line perpendicular to the drawing surface of FIG. 4).

The shape of the ith surface as a part of the optical system can be understood and recognized more easily by setting and using a local coordinate system in which the intersection between a reference axis and the ith surface is set as an origin than by using an absolute coordinate axis. For this reason, in each numerical embodiment indicating the constituent data of the present invention, the shape of the ith surface is expressed by the local coordinate system.

The tilt angle of the ith surface within the Y-Z plane is expressed by an angle $\theta i$ (°) with a counterclockwise direction (defining an elevation angle) with respect to the Z-axis in the absolute coordinate system being considered as a positive direction. In each numerical embodiment of the present invention, therefore, the origin of the local coordinate system for each surface is located on the Y-Z plane in FIG. 4.

There is no surface eccentricity within the X-Z and X-Y planes. In addition, the y- and z-axes in the local coordinate system (x,y,z) for the ith surface is inclined at the angle $\theta i$ within the Y-Z plane with respect to the absolute coordinate system (X,Y,Z). More specifically, the respective axes are set as follows:

- z-axis: a straight line passing through the origin of the local coordinate system and defining the angle $\theta i$ within the Y-Z plane with respect to the Z direction in the absolute coordinate system in the counterclockwise direction.
- y-axis: a straight line passing through the origin of the local coordinate system and defining 90° within the Y-Z plane with respect to the z direction in the counterclockwise direction.
- x-axis: a straight line which passes through the original of the local coordinate system and is perpendicular to the Y-Z plane.

A scalar representing the distance between the origins of the local coordinate systems for the ith and (i+1)th surfaces is represented by Di. The refractive index and Abbe's number of the medium between the ith surface and the (i+1)th surface are represented by Ndi and vdi, respectively.

The optical element in each embodiment has spherical surfaces and rotation asymmetrical non-spherical surfaces. The radius of curvature of each spherical surface is represented by ri. The sign "−" is assigned to the radius of curvature ri when the curvature center is located on the first surface side along the reference axis (the alternate long and short dashed line in FIG. 4) extending from the first surface to the image plane or the observation plane, whereas the sign "+" is assigned to the radius of curvature ri when the curvature center is located on the imaging plane side.

The shape of each spherical surface is expressed by the following equation:

$$z = \frac{(x^2 + y^2)/r_i}{1 + \{1 - (x^2 + y^2)/r_i^2\}^{1/2}}$$

At least one of the incident and exit surfaces of the optical element is a rotation asymmetrical non-spherical surface, and its shape is expressed by the following equations:

$$A = (a + b) \cdot (y^2 \cdot \cos^2 t + x^2)$$

$$B = 2a \cdot b \cdot \cos t [1 + \{(b - a) \cdot y \cdot \sin t / (2a \cdot b)\} + [1 + \{(b - a) \cdot y \cdot \sin t / (a \cdot b)\} - \{y^2 / (a \cdot b)\} - \{4a \cdot b \cdot \cos^2 t + (a + b)^2 \sin^2 t\} x^2 / (4a^2 b^2 \cos^2 t)]^{1/2}]$$

$$z = A/B + C_{02}y^2 + C_{11}xy + C_{20}x^2 + C_{03}y^3 + C_{12}xy^2 + C_{21}x^2y + C_{04}y^4 + C_{13}xy^3 + C_{22}x^2y^2 + C_{31}x^3y + C_{40}x^4 + \ldots$$

Each rotation asymmetrical surface in each embodiment has a shape symmetrical with respect to the y-z plane with only the even-order terms associated with "x" in the above equations being used and the odd-order terms being set to 0. If the following condition is satisfied, the above equations represent a shape symmetrical with respect to the x-z plane.

$$C_{03} = C_{21} = t = 0$$

If the following condition is satisfied, the above equations represent a rotation symmetrical shape.

$$C_{02} = C_{20} \quad C_{04} = C_{40} = C_{22}/2$$

If the above condition is not satisfied, the above equations represent a rotation asymmetrical shape.

A power $\phi$ of each rotation asymmetrical surface in the present invention is calculated by equation (1):

$$\phi = \frac{2(N'\cos\theta' - N\cos\theta)\{\cos\xi'\cos\xi C_{02} + (\cos\theta'\sin\xi'\cos\xi + \cos\theta\cos\xi'\sin\xi)C_{11} + \cos\theta\cos\theta'\sin\xi'\sin\xi C_{20}\}}{\sqrt{\cos\theta\cos\theta'(\cos\theta'\cos\xi'\cos\xi + \cos\theta\sin\xi'\sin\xi)(\cos\theta'\sin\xi'\sin\xi + \cos\theta\cos\xi'\cos\xi)}} \quad (1)$$

where N is the refractive index on the incident side, N' is the refractive index on the exit side, $\theta$ is the incident angle of an incident reference axis light beam on the surface, and $\theta$ is the exit angle of the reference axis light beam from the surface. These values satisfy the refraction law:

$$N \sin\theta = N' \sin\theta \quad (2)$$

In equation (1), $\epsilon$ represents an azimuth. The refraction surface of the reference axis is defined as $\epsilon=0$. In the present invention, the y-z plane is defined as $\epsilon=0$. $\epsilon'$ represents an ideal azimuth in the absence of an aberration. In calculating a power, it suffices if $\epsilon=\epsilon'$.

In the present invention, since each odd-order term is set to 0, equation (1) can be rewritten into equation (3):

$$\phi = \frac{2(N'\cos\theta' - N\cos\theta)(\cos^2\xi C_{02} + \cos\theta\cos\theta'\sin^2\xi C_{20})}{\sqrt{\cos\theta\cos\theta'(\cos\theta'\cos^2\xi + \cos\theta\sin^2\xi)(\cos\theta'\sin^2\xi + \cos\theta\cos^2\xi)}} \quad (3)$$

In representing each reflection surface, since $N'=-N$ and $\theta'=-\theta'$, equation (3) can be rewritten into equation (4):

$$\phi = \frac{-4N(\cos^2\xi C_{02} + \cos^2\theta\sin^2\xi C_{20})}{\cos\theta} \quad (4)$$

In each numerical embodiment of the present invention, the phototaking field is expressed by a horizontal half field angle $u_Y$ and a vertical half field angle $u_X$. The horizontal half field angle $u_Y$ is the maximum half field angle at which a light beam is incident on the first surface R1 within the Y-Z plane in FIG. 4. The vertical half field angle $u_X$ is the maximum half field angle at which a light beam is incident on the first surface R1 within the X-Z plane.

The diameter of a stop is given as an amount representing the brightness of the optical system.

An image size is given as an effective image range on an image plane. Each image size is represented by a rectangular area with a horizontal line representing a size in the y direction in the local coordinate system, and a vertical line representing a size in the x direction.

Each numerical embodiment indicating the constituent data of the present invention is described with reference to a chart showing transverse aberrations. This chart shows the transverse aberrations of light beams incident at the following horizontal and vertical incident angles: $(u_Y,u_X)$, $(0,u_X)$, $(-u_Y,u_X)$, $(u_Y,0)$, $(0,0)$, and $(-u_Y,0)$.

In each transverse aberration chart, the abscissa represents the incident height of light on the pupil, and the ordinate represents the aberration amount of light. In each embodiment, since each surface is basically symmetrical with respect to the y-z plane, the vertical field angles in the positive direction coincide with those in the negative direction in each transverse aberration chart. For the sake of simplicity, therefore, transverse aberration charts in the negative directions are omitted.

In each chart, each solid line represents an aberration along the d-line, and each dotted line represents an aberration along the g-line.

Figure 5:
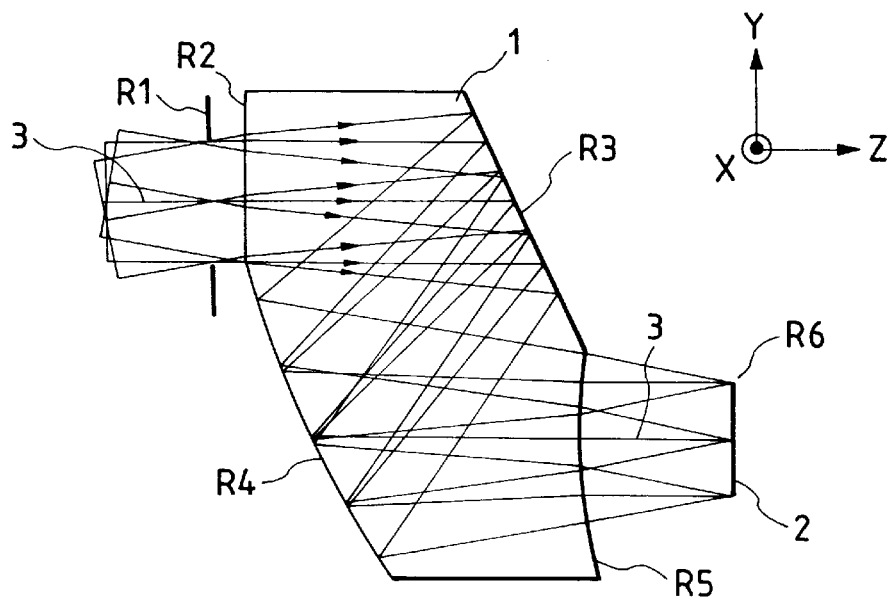
FIG. 5 is a sectional view showing an optical device according to the first embodiment, together with optical paths.

FIG. 5 is a sectional view showing an optical device using a phototaking optical system according to the first embodiment of the present invention. The optical element of this embodiment serves as an imaging lens.

Referring to FIG. 5, this device includes an optical element 1, an imaging plane 2, e.g., a photosensitive film or a photoelectric conversion element such as a CCD, a reference axis 3, and a stop 4 for regulating the amount of light incident from an object.

The optical element 1 in this embodiment has the following surfaces formed on the surface of a transparent member in the order in which light from an object is incident: a first refraction surface R1 (refraction incident surface) serving as an incident surface, a convex mirror R2 inclined with respect to the reference axis and serving as a first reflection surface, a concave mirror R3 inclined with respect to the reference axis and serving as a second reflection surface, and a second refraction surface R4 (refraction exit surface) having a negative power.

That is, the optical element 1 is constituted by the two reflection surfaces and the two refraction surfaces. The first refraction surface R1 and the first reflection surface R2 constitute a front group having a negative power. The second reflection surface R3 and the second refraction surface R4 constitute a rear group having a positive power.

All the refraction and reflection surfaces are rotation asymmetrical surfaces.

An imaging operation in this embodiment will be described next. After the incident light amount of a light beam from an object is regulated by the stop 4, the light beam is incident on the first refraction surface R1. The light beam is then incident on the convex mirror R2 placed behind the first refraction surface R1 to be converted into a divergent light beam owing to the negative power of the convex mirror R2. The object light beam is also incident on the concave mirror R3. As a result, the object light beam is reflected toward the lower left within the drawing surface of FIG. 5.

The divergent light beam incident on the concave mirror R3 is converted into a convergent light beam owing to the positive power of the concave mirror R3. The light beam is also reflected in the positive direction of the Z-axis to be parallel to the incident reference axis of the optical element 1. The reflected object light beam undergoes the refracting effect of the second refraction surface R4 having a negative power. The resultant light beam is formed into an image on the imaging plane 2.

The direction of the reference axis incident on the optical element 1 is parallel with and the same as that of the reference axis emerging from the optical element 1.

As described above, the optical device of this embodiment is constituted by only the stop 4, the single optical element 1, and the imaging plane 2. Since the optical element 1 is obtained by integrally forming two refraction surfaces and two reflection surfaces on the surface of a transparent member such as an optical glass member or a colorless, transparent plastic member, the number of parts and the cost of the optical element can be reduced as compared with a conventional imaging lens obtained by using a plurality of refraction lenses.

In addition, in this embodiment, by forming each surface using a rotation asymmetrical surface, asymmetrical aberrations caused by the power of each reflection surface are corrected.

Furthermore, in this embodiment, since the refraction surfaces are rotation asymmetrical surfaces as well as the reflection surfaces, in particular, eccentricity aberrations are corrected by using the refraction surfaces as well as the reflection surfaces. Therefore, well-balanced correction of eccentricity aberrations can be performed, and the overall optical performance can be improved.

Figure 6:
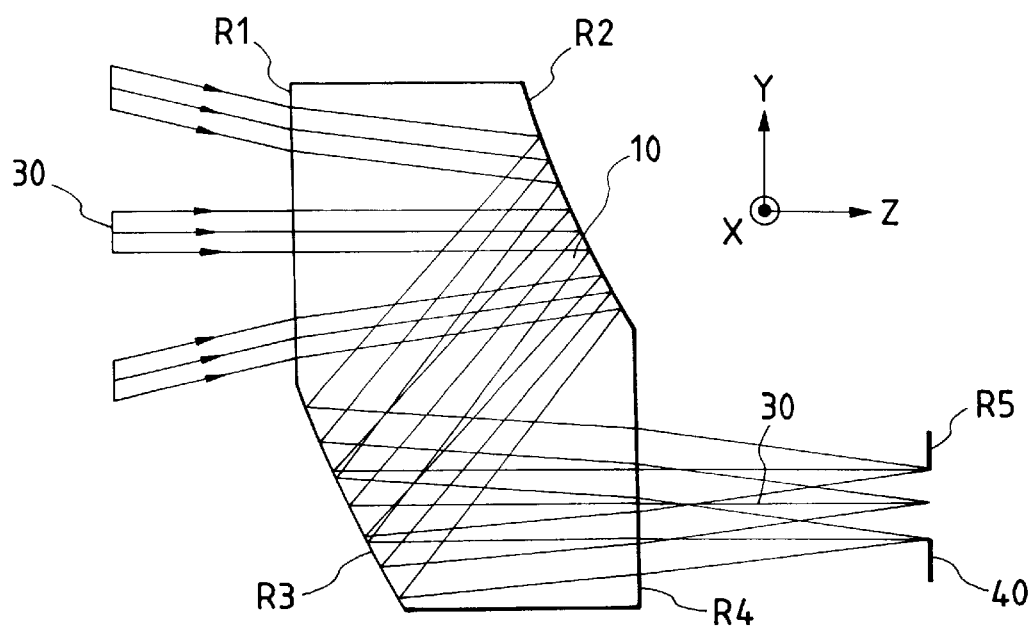
FIG. 6 is a sectional view showing an optical device according to the second embodiment, together with optical paths.

FIG. 6 is a sectional view showing an optical device using an optical element according to the second embodiment of the present invention. The optical element in this embodiment serves as a finder optical system.

Referring to FIG. 6, an optical element 10 is obtained by forming the following surfaces on a transparent member in the order in which light from an object is incident: a first refraction surface R1 (refraction incident surface) serving as an incident surface, a convex mirror R2 inclined with respect to a reference axis and serving as a first reflection surface, a concave mirror R3 inclined with respect to the reference axis and serving as a second reflection surface, and a second refraction surface R4 (refraction exit surface).

That is, the optical element 10 is constituted by the two reflection surfaces and the two refraction surfaces. The first refraction surface R1 and the first reflection surface R2 constitute a front group having a negative power. The second reflection surface R3 and the second refraction surface R4 constitute a rear group having a positive power.

Note that all the refraction and reflection surfaces are rotation asymmetrical surfaces.

The optical element 10 has an exit pupil 40 and a reference axis 30.

An optical operation in this embodiment will be described next. A light beam (a light beam at an object distance of 1 m in this embodiment) from an object is incident on the first refraction surface R1 to be refracted and enters the optical element 10. The light beam is then incident on the convex mirror R2. The light beam is converted into a divergent light beam owing to the negative power of the convex mirror R2. The object light beam is also incident on the concave mirror R3. As a result, the light beam is reflected to lower left in the drawing surface of FIG. 6.

The divergence angle of the object light beam is reduced owing to the positive power of the concave mirror R3, and is reflected in the positive direction of the Z-axis to be parallel to the incident reference axis of the optical element 10. The reflected object light beam undergoes the refracting effect of the second refraction surface R4 and passes therethrough. As a result, the light beam emerges as an observation light beam of −1 diopter from the optical element 10, and passes through the exit pupil 40 at a predetermined distance from the optical element 10. When the pupil of the observer is overlaid with the exit pupil 40, the object light beam is incident on the pupil of the observer, allowing observation of the object image.

The direction of the reference axis incident on the optical element 10 is parallel with and the same as that of the reference axis emerging from the optical element 10.

In this embodiment, since the optical element 10 as the finder optical system is obtained by integrally forming two refraction surfaces and two reflection surfaces on the surface of a transparent member such as an optical glass member or a colorless, transparent plastic member, the number of parts and the cost of the optical element can be reduced as compared with a conventional finder optical system obtained by using a plurality of refraction lenses.

In addition, in this embodiment, by forming each surface using a rotation asymmetrical surface, asymmetrical aberrations caused by the power of each reflection surface are corrected.

Furthermore, in this embodiment, since the refraction surfaces are rotation asymmetrical surfaces as well as the reflection surfaces, in particular, eccentricity aberrations are corrected by using the refraction surfaces as well as the reflection surfaces. Therefore, well-balanced correction of eccentricity aberrations can be performed, and the overall optical performance can be improved.

The following are the numerical embodiments.

[First Numerical Embodiment]

| | | |
|---|---|---|
| Horizontal Half Field Angle: | 10.2° | |
| Vertical Half Field Angle: | 13.5° | |
| Stop Diameter: | 4.00 mm | |
| Image Size: | 4.8 mm × 3.6 mm | |

| i | Yi | Zi | θi | Di | Ndi | νdi | |
|---|------|-------|-------|-------|---------|-------|---|
| 1 | 0.00 | 0.00  | 0.00  | 1.00  | 1       |       | stop |
| 2 | 0.00 | 1.00  | 0.00  | 8.50  | 1.77250 | 49.60 | refraction surface |
| 3 | 0.00 | 9.50  | 25.00 | 10.00 | 1.77250 | 49.60 | reflection surface |
| 4 | −7.66 | 3.07 | 25.00 | 8.50  | 1.77250 | 49.60 | reflection surface |
| 5 | −7.66 | 11.57 | 0.00 | 4.90  | 1       |       | refraction surface |
| 6 | −7.66 | 16.47 | 0.00 |       | 1       |       | image plane |

Non-spherical Shape:

Surface R2

$C_{02} = 2.34902e{-03}$    $C_{20} = 9.43647e{-03}$
$C_{03} = 4.62279e{-04}$    $C_{21} = 1.87107e{-03}$
$C_{04} = -2.59813e{-04}$   $C_{22} = 2.85697e{-04}$    $C_{40} = 9.86335e{-05}$

Surface R3

$C_{02} = 2.43812e{-03}$    $C_{20} = -4.04256e{-03}$
$C_{03} = 3.20410e{-04}$    $C_{21} = 1.46969e{-03}$
$C_{04} = -7.17572e{-05}$   $C_{22} = 1.20304e{-04}$    $C_{40} = 1.06909e{-05}$
$C_{05} = 1.17565e{-06}$    $C_{23} = -8.75199e{-07}$   $C_{41} = -2.66319e{-05}$
$C_{06} = 2.25273e{-06}$    $C_{24} = 2.12535e{-06}$    $C_{42} = 6.53903e{-06}$
$C_{60} = 1.81867e{-06}$

Surface R4

$C_{02} = 1.63110e{-02}$    $C_{20} = 1.60582e{-03}$
$C_{03} = -6.59108e{-06}$   $C_{21} = 1.49312e{-03}$
$C_{04} = -2.12371e{-05}$   $C_{22} = -2.24416e{-06}$   $C_{40} = -2.05108e{-04}$
$C_{05} = 3.64136e{-07}$    $C_{23} = -4.62309e{-06}$   $C_{41} = 2.78891e{-06}$
$C_{06} = 5.36724e{-07}$    $C_{24} = 1.54018e{-07}$    $C_{42} = 4.32617e{-06}$
$C_{60} = 7.96830e{-07}$

Surface R5

$C_{02} = 2.77661e{-02}$    $C_{20} = -7.11448e{-02}$
$C_{03} = -1.21962e{-03}$   $C_{21} = 5.04098e{-03}$
$C_{04} = 1.00000e{-10}$    $C_{22} = 1.00000e{-10}$    $C_{40} = 1.00000e{-10}$

In the first numerical embodiment, the powers of the respective surface and the overall system are set as follows:

| Surface Power (Surface Power at Azimuth of 0) | |
|---|---|
| R2 | 0.00363 |
| R3 | −0.01907 |
| R4 | 0.12760 |
| R5 | −0.04290 |

Figure 7:
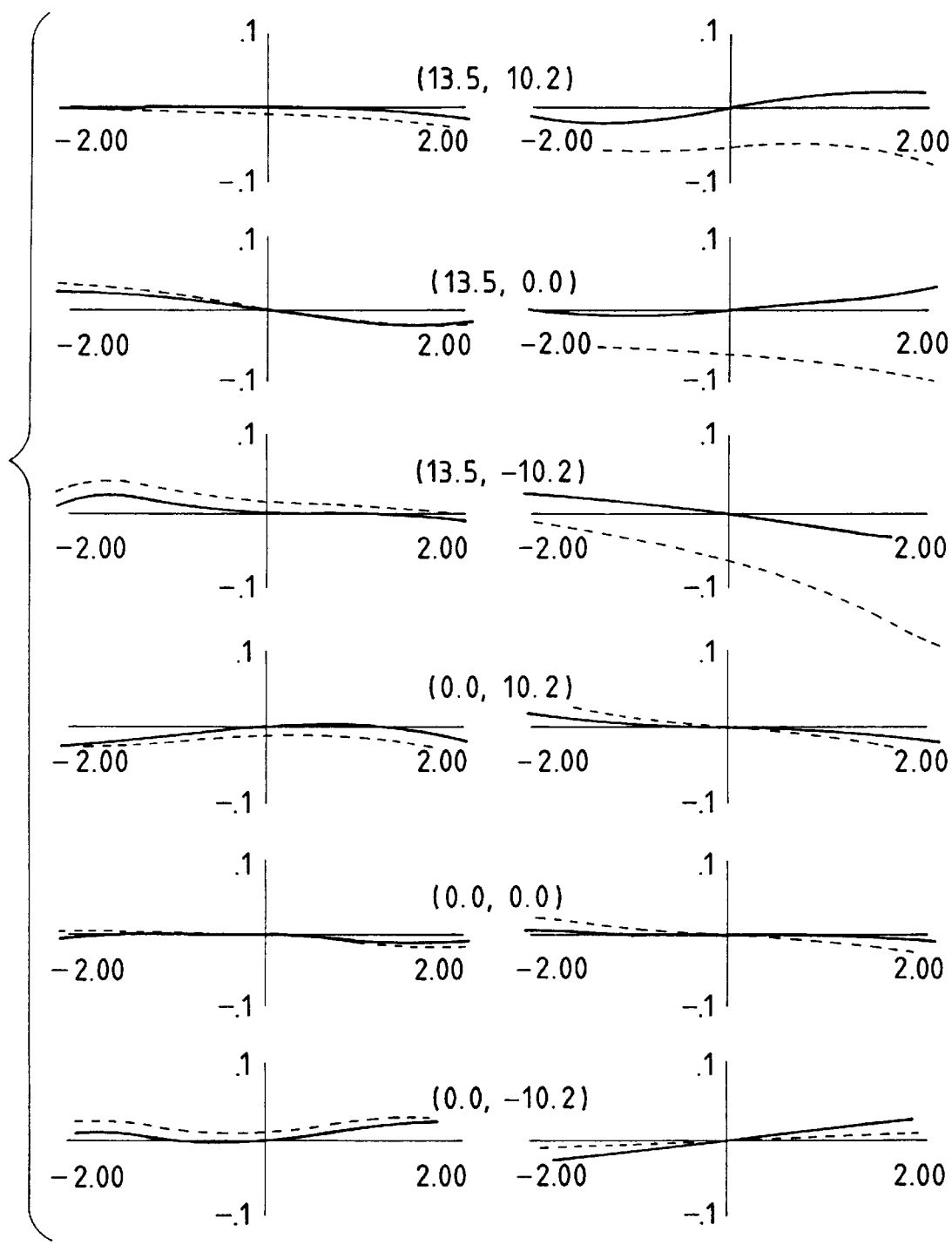
FIG. 7 is a chart showing transverse aberrations in a phototaking optical system according to the first embodiment.

FIG. 5 is a sectional view showing the first numerical embodiment, together with optical paths. FIG. 7 is an aberration chart in the first numerical embodiment.

[Second Numerical Embodiment]

| | |
|---|---|
| Angular Magnification: | 0.6× |
| Horizontal Half Field Angle: | 8.0° |
| Vertical Half Field Angle: | 6.0° |
| Pupil Diameter: | 4.0 mm |

| i | Yi | Zi | θi | Di | Ndi | νdi | |
|---|--------|-------|-------|-------|---------|-------|---|
| 1 | 0.00   | 0.00  | 0.00  | 16.00 | 1.77250 | 49.60 | refraction surface |
| 2 | 0.00   | 16.00 | 25.00 | 20.00 | 1.77250 | 49.60 | reflection surface |
| 3 | −15.32 | 3.14  | 25.00 | 16.00 | 1.77250 | 49.60 | reflection surface |
| 4 | −15.32 | 19.14 | 0.00  | 16.00 | 1       |       | refraction surface |
| 5 | −15.32 | 35.14 | 0.00  | 0.00  | 1       |       | pupil |

Non-spherical Shape:

Surface R1

$C_{02} = 9.36097e{-04}$    $C_{20} = -2.44805e{-03}$
$C_{03} = -1.87958e{-04}$   $C_{21} = -1.29951e{-04}$

Surface R2

$C_{02} = 7.87520e{-03}$    $C_{20} = 6.93463e{-03}$
$C_{03} = -2.07350e{-04}$   $C_{21} = -3.50341e{-04}$
$C_{04} = 1.13682e{-06}$    $C_{22} = -5.50695e{-07}$   $C_{40} = 1.12261e{-06}$
$C_{05} = -7.16009e{-08}$   $C_{23} = 1.99773e{-07}$    $C_{41} = -1.85888e{-09}$
$C_{06} = -4.66897e{-09}$   $C_{24} = -3.49980e{-08}$   $C_{42} = -5.26526e{-10}$
$C_{60} = -1.69469e{-08}$

Surface R3

$C_{02} = 4.70925e{-03}$    $C_{20} = 4.56148e{-03}$
$C_{03} = -1.07368e{-04}$   $C_{21} = -2.38986e{-04}$
$C_{04} = -1.11036e{-06}$   $C_{22} = -4.67163e{-06}$   $C_{40} = -4.83248e{-07}$
$C_{05} = -4.96427e{-08}$   $C_{23} = -9.41692e{-08}$   $C_{41} = -7.67939e{-08}$
$C_{06} = -3.08851e{-09}$   $C_{24} = -1.83818e{-10}$   $C_{42} = -9.52489e{-09}$
$C_{60} = -6.15051e{-09}$

Surface R4

$C_{02} = 1.08323e{-03}$    $C_{20} = -7.64781e{-04}$
$C_{03} = -4.51818e{-04}$   $C_{21} = -7.32932e{-04}$

In the second numerical embodiment, the powers of the respective surface and the front and rear groups are set as follows:

| Surface Power (Surface Power at Azimuth of 0) | |
|---|---|
| R1 | 0.00145 |
| R2 | −0.06161 |
| R3 | 0.03684 |
| R4 | −0.00167 |
| Group Power (Group Power at Azimuth of 0) | |
| Front Group (R1–R2) | −0.05936 |
| Rear Group (R3–R4) | 0.03572 |

Figure 8:
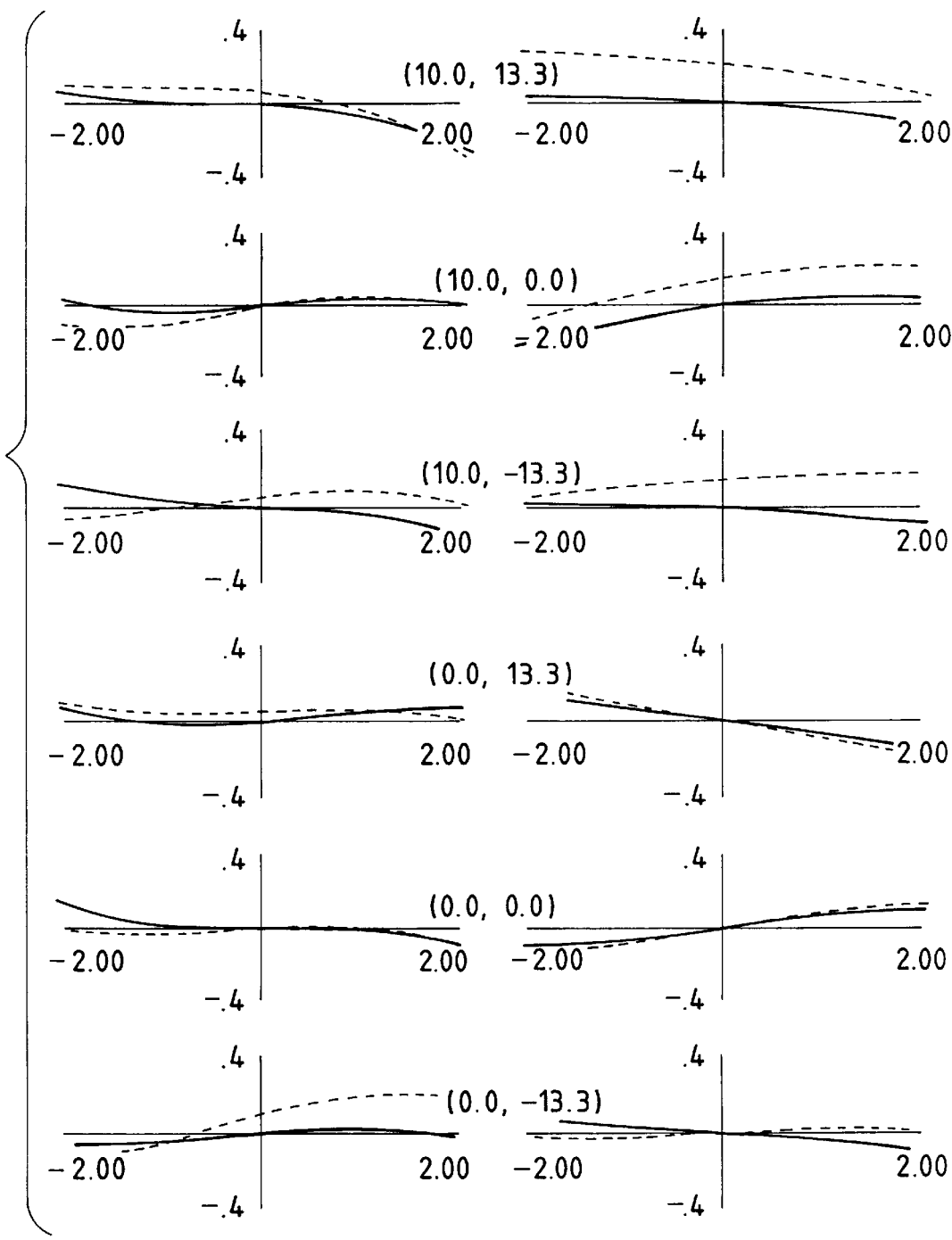
FIG. 8 is a chart showing transverse aberrations in a finder optical system according to the second embodiment.

FIG. 6 is a sectional view showing the second numerical embodiment, together with optical paths. FIG. 8 is an aberration chart in the second numerical embodiment.

Each numerical embodiment described above is associated with one optical element. In order to keep the power (refracting power) of the overall optical element constant regardless of an azimuth, each surface may be formed to satisfy the following relation with respect to the coefficients $C_{20}$, $C_{11}$, and $C_{02}$ for the surface shape, of the coefficients representing the shape of each of the reflection and refraction surfaces, which are proportional to the curvature:

$C_{11}=0$ $C_{02}/(C_{20} \times \cos^2\theta)=1$ where $\theta$ is the incident angle of a reference axis light beam on the surface.

If, however, the coefficients are set to satisfy the above relation for each of the surfaces constituting the optical element, the degree of freedom in setting powers for the respective surfaces is reduced to zero.

In each numerical embodiment of the present invention, therefore, the following relations are set for at least two surfaces constituting the optical element:

$C_{02}/(C_{20} \times \cos^2\theta) \neq 1$ $\alpha = (C_{02})_1 \times (C_{02})_2 \times \ldots \times (C_{02})_n$ $\beta = (C_{20} \times \cos^2\theta)_1 \times (C_{20} \times \cos^2\theta)_2 \times \ldots \times (C_{20} \times \cos^2\theta)_n$ where n is the total number of surfaces constituting the optical element, and each subscribed suffix represents a surface number. A certain degree of freedom in setting powers can be ensured by satisfying:

$0 < k = \alpha/\beta$     (condition 1)

Preferably, k in condition 1 is set as follows to keep the power of the optical system substantially constant regardless of an azimuth while ensuring a certain degree of freedom in setting powers:

$0.1 < k < 10.0$     (condition 2)

More preferably, k in condition 2 is set as follows to ensure a certain degree of freedom in setting powers without greatly degrading the rotation symmetry of each surface:

$0.2 < k < 5.0$     (condition 3)

Note that if the upper and lower limit values in conditions 1 to 3 are exceeded, it is difficult to keep the power of the system constant regardless of an azimuth, and the symmetry of light beams incident from the respective azimuths is degraded to cause an asymmetrical aberration exceeding the allowable value.

The following are the values of $C_{02}/(C_{20} \times \cos^2\theta)$, $\alpha$, $\beta$, and k for the respective surfaces in the respective numerical embodiments:

| First Numerical Embodiment Surface Number $C_{02}/(C_{20} \times \cos^2\theta)$ | Second Numerical Embodiment Surface Number $C_{02}/(C_{20} \times \cos^2\theta)$ |
|---|---|
| R1 0.24893 | R1 −0.38238 |
| R2 −0.73426 | R2 1.38257 |
| R3 12.36609 | R3 1.25688 |
| R4 −0.39028 | R4 −1.41639 |
| $\alpha$ = 2.59380e−9 | $\alpha$ = 3.76058e−11 |
| $\beta$ = 2.94042e−9 | $\beta$ = 3.99567e−11 |
| $\kappa$ = 0.88212 | $\kappa$ = 0.94116 |

What is claimed is:

1. A phototaking optical system comprising a solid optical element including:

a refraction incident surface on which light from an object is incident;

a curved reflection surface which reflects the light from said refraction incident surface; and a refraction exit surface from which the light from said curved reflection surface emerges, wherein at least one of said refraction incident surface and said refraction exit surface is a rotation asymmetrical surface, and wherein when each surface of said optical element is expressed by a local coordinate system (x,y,z) using an intersection with a reference axis as an origin as follows:

$$z = A/B + C_{02}y^2 + C_{11}xy + C_{20}x^2 + C_{03}y^3 + C_{12}xy^2 +$$
$$C_{21}x^2y + C_{04}y^4 + C_{13}xy^3 + C_{22}x^2y^2 + C_{31}x^2y +$$
$$C_{40}x^4 + \ldots$$

for $$B = 2a \cdot b \cdot \cos t[1 + \{(b-a) \cdot y \cdot \sin t/(2a \cdot b)\} +$$
$$[1 + \{(b-a) \cdot y \cdot \sin t/(a \cdot b)\} - y^2/(a \cdot b)] -$$
$$\{4a \cdot b \cdot \cos^2 t + (a+b)^2 \sin^2 t\}x^2/(4a^2b^2\cos^2 t)]^{1/2}]$$

where a, b, and $C_{jk}$ are constants, the following equation is set for each surface with j being an odd number:

$C_{jk}=0$.

2. A system according to claim 1, wherein at least two of said each surface satisfy following condition:

$C_{02}/(C_{20} \times \cos^2\theta) \neq 1$ wherein $\theta$ is an angle between a normal line to each surface at said origin and said reference axis.

3. A system according to claim 2, wherein the following condition is satisfied:

$\alpha/\beta > 0$ wherein $\alpha = (C_{02})_1 \times (C_{02})_2 \times \ldots \times (C_{02})_n$, $\beta = (C_{20} \times \cos^2\theta)_1 \times$ $$(C_{20} \times \cos^2\theta)_2 \times \ldots \times (C_{20} \times \cos^2\theta)_n$$

and n: the total number of surfaces forming said optical element.

4. A system according to claim 3, wherein the following condition is satisfied:

$$0.1 < \alpha/\beta < 10.0.$$

5. A system according to claim 3, wherein the following condition is satisfied:

$$0.2 < \alpha/\beta < 5.0.$$

6. A solid optical element comprising:

a refraction incident surface on which light from an object is incident;

a curved reflection surface which reflects the light from said refraction incident surface; and a refraction exit surface from which the light from said curved reflection surface emerges, wherein at least one of said refraction incident surface and said refraction exit surface is a rotation asymmetrical surface, wherein a reference axis connecting an object center and a pupil center of said optical element is parallel to said refraction incident surface and said refraction exit surface, and wherein when each surface of said optical element is expressed by a local coordinate system (x,y,z) using an intersection with a reference axis as an origin as follows:

$$z = A/B + C_{02}y^2 + C_{11}xy + C_{20}x^2 + C_{03}y^3 + C_{12}xy^2 + C_{21}x^2y + C_{04}y^4 + C_{13}xy^3 + C_{22}x^2y^2 + C_{31}x^3y + C_{40}x^4 + \ldots$$

for $$B = 2a \cdot b \cdot \cos t [1 + \{(b-a) \cdot y \cdot \sin t / (2a \cdot b)\} + [1 + \{(b-a) \cdot y \cdot \sin t / (a \cdot b)\} - \{y^2/(a \cdot b)\} - \{4a \cdot b \cdot \cos^2 t + (a+b)^2 \sin^2 t\} x^2 / (4a^2b^2\cos^2 t)]^{1/2}]$$

where a, b, and $C_{jk}$ are constants, the following equation is set for each surface with j being an odd number:

$$C_{jk} = 0.$$

7. A system according to claim 6, wherein at least two of said each surface satisfy following condition:

$$C_{02}/(C_{20} \times \cos^2\theta) \neq 1$$

wherein e is an angle between a normal line to each surface at said origin and said reference axis.

8. A system according to claim 7, wherein the following condition is satisfied:

$$\alpha/\beta > 0$$

wherein $\alpha = (C_{02})_1 \times (C_{02})_2 \times \ldots \times (C_{02})_n$, $\beta = (C_{20} \times \cos^2\theta)_1 \times (C_{20} \times \cos^2\theta)_2 \times \ldots \times (C_{20} \times \cos^2\theta)_n$ and n: the total number of surfaces forming said optical element.

9. An element according to claim 8, wherein the following condition is satisfied:

$$0.1 < \alpha/\beta < 10.0.$$

10. A system according to claim 9, wherein the following condition is satisfied:

$$0.2 < \alpha/\beta < 5.0.$$

* * * * *

UNITED STATES PATENT AND TRADEMARK OFFICE
CERTIFICATE OF CORRECTION

PATENT NO. : 5,917,662

DATED : June 29, 1999

INVENTOR(S) : Makoto SEKITA

It is certified that error appears in the above-identified patent and that said Letters Patent is hereby corrected as shown below:

ON THE COVER PAGE

At Item [75], Inventor:

"Tokyo" should read --Yokohama--.

COLUMN 2:

Line 64, "including" should read --including:--.

UNITED STATES PATENT AND TRADEMARK OFFICE
CERTIFICATE OF CORRECTION

PATENT NO. : 5,917,662

DATED : June 29, 1999

INVENTOR(S) : Makoto SEKITA

It is certified that error appears in the above-identified patent and that said Letters Patent is hereby corrected as shown below:

COLUMN 6:

Line 41, "and $\theta$" should read --and $\theta'$--.
   Line 44, "N'sin$\theta$" should read --N'sin$\theta'$--.

COLUMN 10:

Line 24, insert --Overall System Power (Power at Azimuth of 0) 0.10026--.

COLUMN 12:

Line 44, insert --$A=(a+b) \cdot (y^2 \cdot \cos^2 t + x^2)$--.
   Line 46, "$y^2$" should read --$\{y^2$--.

COLUMN 13:

Line 1, "Cos$^2\theta$" should read --cos$^2\theta$--.

COLUMN 14:

Line 2, insert --$A=(a+b) \cdot (y^2 \cdot \cos^2 t + x^2)$--.
   Line 19, "e is" should read --$\theta$ is--.

UNITED STATES PATENT AND TRADEMARK OFFICE
CERTIFICATE OF CORRECTION

PATENT NO. : 5,917,662

DATED : June 29, 1999

INVENTOR(S) : Makoto SEKITA

It is certified that error appears in the above-identified patent and that said Letters Patent is hereby corrected as shown below:

<u>COLUMN 14</u>:

Line 26, "Cos$^2\theta$" should read --cos$^2\theta$--.

Signed and Sealed this

Fifth Day of December, 2000

Attest:

Q. TODD DICKINSON

*Attesting Officer*     *Director of Patents and Trademarks*